Figure 1:
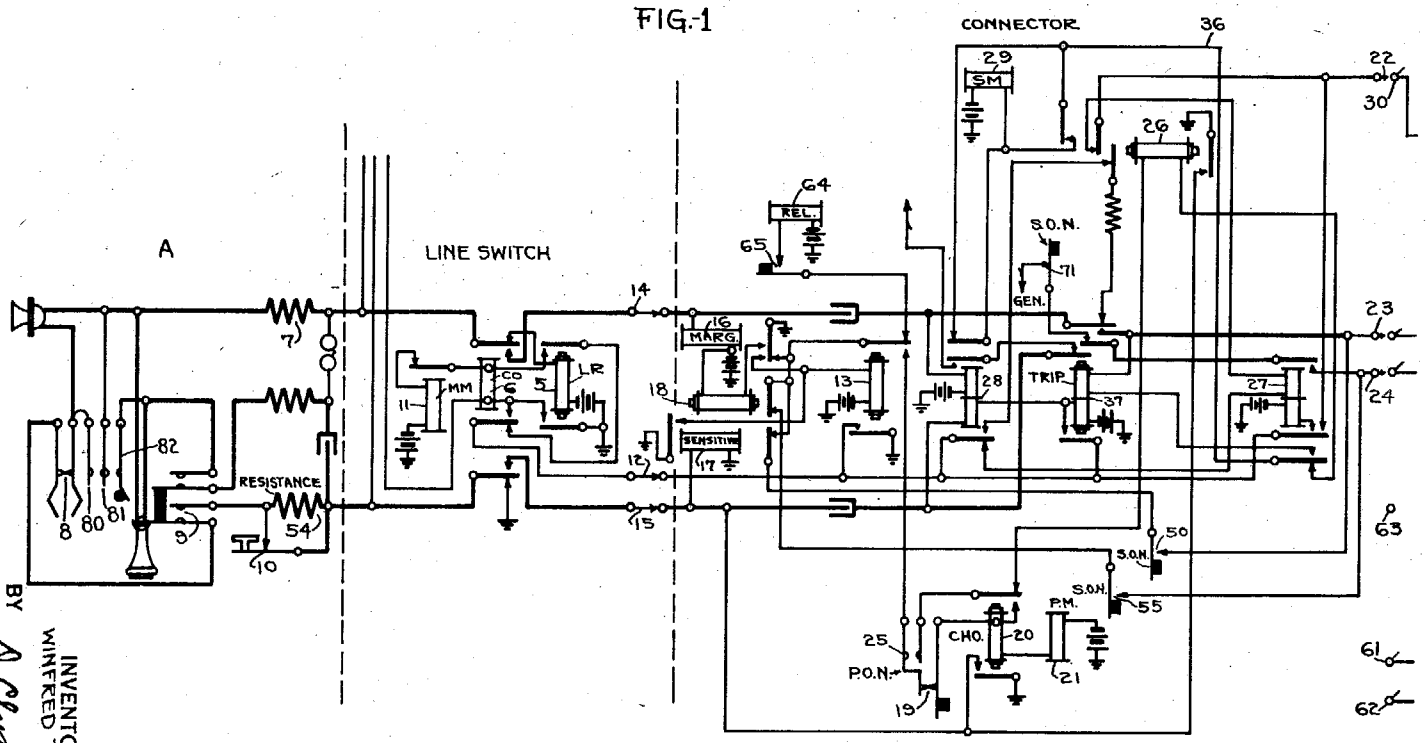

Oct. 25, 1932. W. T. POWELL Re. 18,637

RADIO RECEIVING SYSTEM

Original Filed Sept. 22. 1922 2 Sheets-Sheet 1

INVENTOR
WINFRED T. POWELL
BY D. Clyde Jones
ATTORNEY

Oct. 25, 1932. W. T. POWELL Re. 18,637
RADIO RECEIVING SYSTEM
Original Filed Sept. 22, 1922 2 Sheets-Sheet 2
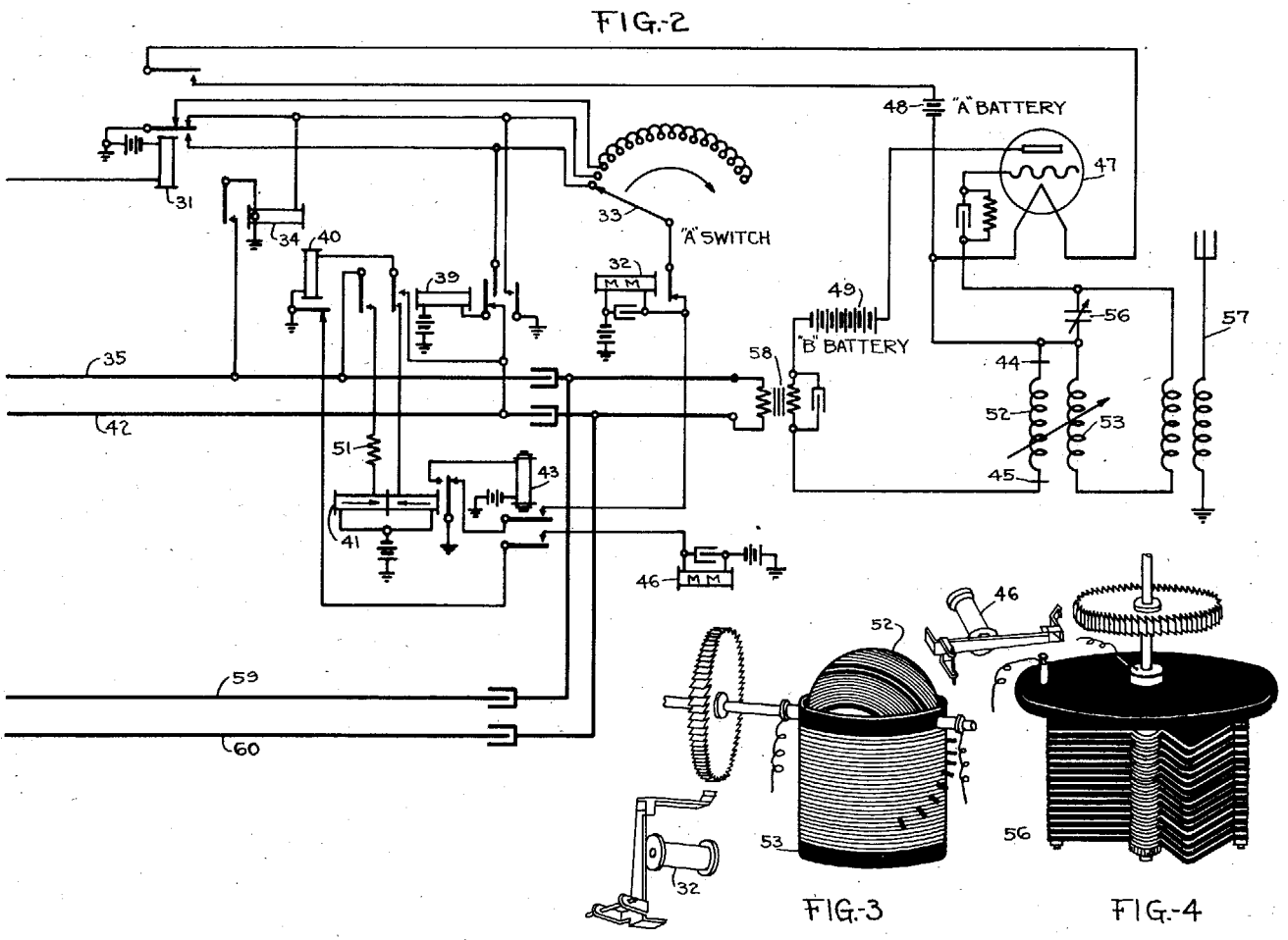
INVENTOR
WINFRED T. POWELL
BY D. Clyde Jones
ATTORNEY Reissued Oct. 25, 1932

Re. 18,637

UNITED STATES PATENT OFFICE

WINFRED T. POWELL, OF ROCHESTER, NEW YORK, ASSIGNOR TO THE STROMBERG-CARLSON TELEPHONE MANUFACTURING COMPANY, OF ROCHESTER, NEW YORK, A CORPORATION OF NEW YORK

RADIO RECEIVING SYSTEM

Original No. 1,655,160, dated January 3, 1928, Serial No. 589,792, filed September 22, 1922. Application for reissue filed February 6, 1931. Serial No. 514,303.

This invention relates to combined automatic and radio receiving telephone systems.

It is the purpose of this invention to provide a centrally located radio telephone receiving outfit which may be remotely controlled and which will repeat signals into the transmission lines of an automatic telephone system. One of the features of the present invention is therefore the remote control of a radio receiving outfit.

Another feature is the arrangement by which the radio telephone messages may be communicated to the transmission lines of a telephone system.

Other features of this invention will appear from the detailed description and appended claims.

Figs. 1 and 2 when taken together represent an automatic telephone system and a radio receiving outfit. At the left hand side of Fig. 1 there is represented a subscriber's substation circuit, while the portion of circuits between the dotted lines represents the operating circuits of a line switch, and at the right hand side of this figure there appears the operating circuits of a numerical switch such as a connector switch. In Fig. 2, there is diagrammatically represented a radio telephone receiving set of the single vacuum tube regenerative type together with the mechanism and controlling circuits by which the various parts are remotely controlled. Fig. 3 is a perspective view of a vario-coupler forming a part of a so-called A switch. Fig. 4 is a perspective view of a variable condenser which is directively adjustable by means of the mechanisms of a progressively movable switch.

The line switches as well as the switch herein designated A and the mechanisms of the variable condenser may be of a type similar to that disclosed in the patent to Clement #1,107,153 Aug. 11, 1914. The A switch, however, has but a single arc of contacts and a single brush to cooperate therewith, while the brush shaft also has mounted thereon the secondary coil 52 of a vario-coupler shown in Fig. 3. The variable condenser operating mechanism is similar to that of the mentioned type of rotary switches with the brushes and contacts omitted, but the brush shaft which usually carries brushes has mounted thereon the movable plates of a variable condenser 56 of Fig. 4. The connector switch may be substantially similar to that disclosed in the patent to Keith et al. 815,176 granted March 13, 1906. The dial impulse sender diagrammatically represented as associated with the equipment of the substation A may be similar in construction to the impulse sender disclosed on pages 35, 36 (Figs. 32–33) of "Automatic Telegraphy" (1st edition) by Smith and Campbell. As disclosed in the mentioned publication, the dial impulse sender is provided with shunt springs, certain of which short-circuit the telephone receiver at the substation, whereby electrical disturbances in the system are prevented from actuating the telephone receiver to produce undesirable noises during the adjustment of certain parts of the mechanism.

In this arrangement, the subscribers who are entitled to radio telephone service are instructed to dial a predetermined number such as "70" and thereafter the radio telephone set may be remotely controlled by the calling subscriber. In the event that other subscribers desire to listen in on the receiving set that has been adjusted by the first calling subscriber they are instructed to dial a different predetermined number such as "79".

It is believed that the invention will best be understood by describing the method of establishing a telephone connection to the radio telephone receiving set and thereafter describing the method of variably adjusting such set. When the subscriber at A removes his receiver from its switchhook, the line relay 5 is energized in a circuit extending from grounded battery, winding of this relay upper armature and back contact of the cut-off relay 6, over the upper side of the calling line, through winding 7 of the induction coil, the microphone transmitter, impulse springs 8, of the dial impulse sender, switch hook contacts 9, contacts of the key 10, lowermost armature and back contact of the cut-off relay 6 to ground.

Relay 5 is energized in this circuit and at its upper armature completes an operating circuit for the motor magnet 11 traceable from grounded battery, winding, back contact and armature of this magnet, upper front contact and armature of line relay 5, inner back contact and armature of relay 6, test brush 12 and test terminals of busy trunks which are characterized by the presence of ground potential applied through the lower armature and front contact of a relay similar to 13. During this time a circuit is closed for the cut-off relay 6 from grounded battery, winding, back contact and armature of the motor magnet 11, winding of cut-off relay 6, lower front contact and armature of line relay 5 to ground. This circuit is ineffective at this time to operate relay 6 due to the short circuit including the operating circuit just described of the motor magnet 11.

When, however, the test brush 12 encounters the test terminals of an idle trunk, the motor magnet 11 ceases its operation with the brushes 12, 14 and 15 of the line switch in engagement with the terminals of an idle trunk leading to a connector switch. At this time the previously described circuit of cut-off relay 6 is effective and it is operated to disconnect the line relay 5 from the control of the calling line and to extend this line through line switch brush 14, and the winding of the marginal relay 16 to grounded battery, while the other side of the calling line is extended through line switch brush 15 and winding of the sensitive relay 17 to ground. As soon as relay 16 operates it closes an operating circuit for slow releasing relays 13 and 18. At the lower armature and front contact of relay 13 holding ground is applied through test brush 12, inner armature, front contact, and winding of the cut-off relay 6 to grounded battery, through winding of motor magnet 11. This holding circuit maintains the cut-off relay 6 operated until the time of disconnection.

The connector switch is now in readiness to receive directive impulses from the dial sender at the calling substation and since it has been assumed that the predetermined number for the radio telephone receiving set is "70" the calling subscriber first operates his dial sender to transmit seven impulses, in response to each of these impulses relays 16 and 17 retract their armatures but at this time the operation of relay 17 is of no effect.

It will be understood that in the operation of the dial impulse sender to transmit directive impulses, the shunt springs 80, 81 and 82 thereof are moved into contact so that both the transmitter and the telephone receiver are short-circuited. As soon as the dial sender has completed its operation, these shunt springs move out of engagement with each other so that the transmitter and telephone receiver are no longer short-circuited. In response to each retraction of the armature of relay 16 a circuit is closed from ground, armature and back contact of this relay, upper armature and front contact of relay 13, primary off-normal springs 19, winding of slow-releasing change-over relay 20 and winding of the primary motor magnet 21 to ground battery. On each completion of this circuit for the motor magnet it advances the connector switch brushes 22, 23 and 24 one step in their primary direction. As a result of the seven impulses transmitted by the dial sender, the connector brushes are in operative relation to the seventh group of circuits terminating at this switch. It should be noted, however, that after the first primary step of the connector switch, the contacts 19 are open and thereafter the operating circuit of the motor magnet 21 extends from grounded battery, winding of this magnet, winding front contact and armature of change-over relay 20, primary off-normal springs 25 which are now closed, to ground over the remainder of the circuit which is completed at the armature and back contact of the relay 16.

At the close of this series of impulses, the relay 16 maintains its armature attracted for a relatively long time thereby interrupting the operated circuit of the change-over relay 20 and causing this relay to retract its armatures. The release of relay 20, places the connector switch circuits in condition to receive the second series of impulses, which in the case assumed is ten impulses. During the second operation of the dial impulse sender to transmit these impulses, the shunt springs 80, 81, and 82 are again closed to short-circuit and disable the transmitter and the telephone receiver. In response to each of these ten impulses, the relay 16 retracts its armature to complete a circuit from ground, its armature and back contact, upper armature and front contact of relay 13, primary off-normal springs 25, upper armature and back contacts of relay 20, winding of the secondary change-over relay 26, lowermost back contact and armature of relay 27, conductor 36, uppermost back contact and armature of relay 28, winding of secondary motor magnet 29 to grounded battery. Under the control of this circuit, the secondary motor magnet advances the brushes 22, 23 and 24 of the connector switch until they are opposite the tenth set of circuits in the selected group. At the close of this series of impulses, relay 16 maintains its armature attracted for a relatively long interval permitting the secondary change-over relay 26 to deenergize. But, just before relay 26 deenergizes the test of the called circuit is effected and since the called circuit is idle, its test terminal 30 is characterized by the presence of full battery potential so that the relay 28 is not operated at this time. The relays 31 and 27, however, when relay 26 deenergizes, are operated in a circuit from grounded battery, winding of relay 31, test terminal 30, test brush 22, inner left hand armature and back contact of relay 26, upper winding of relay 27, lower back contact and armature of relay 28, front contact and armature of relay 13 to ground.

The operation of relay 27 applies ground to the test terminal 30 to render the called circuit non-selectable, while the operation of relay 31 completes an operating circuit for the motor magnet 32 of the A switch from grounded battery, winding, back contact and armature of this magnet, brush 33 in its first position, front contact and armature of relay 31 to ground. This circuit is effective to advance brush 33 into its second position, when a circuit is closed for operating the relay 34 in series with the magnet 32. Relay 34 on operation closes a circuit from ground through its front contact, conductor 35, connnector brush 23, upper winding of the trip relay 37, lowermost front contact and armature of relay 27, conductor 36, uppermost back contact and armature of relay 28, winding of magnet 29 to grounded battery which operates the trip magnet to disconnect the ringing current, which is applied in the case of an ordinary telephone through secondary off-normal contacts 71. As soon as relay 37 is operated it is locked and a circuit is closed from ground, lower armature and front contact of relay 13, lower armature and front contact of relay 37, lower winding of relay 28, continuity spring and inner armature of relay 37, upper armature and front contact of relay 27, connector brush 24, back contact continuity spring and winding of relay 39 to grounded battery. Relay 39 is operated in this circuit and locks itself operated through its continuity spring and armature to ground at the armature and front contact of relay 31. The operation of relay 39 connects the relays 40 and 41 to conductors 35 and 42 of the extended circuit. Also the operation of relay 39 closes a circuit at its right hand armature and front contact to advance brush 33 of the A switch into its third position. It will thus be seen that relays 40, 39, 41 and 43 are all operated at this time.

At the right of Fig. 2, there are shown the circuits of a vacuum tube radio receiver connected to an antenna circuit 57. This radio receiver is of a type known in the art as a regenerative receiver such as is described in section 199, page 487 of "The Principles Underlying Radio Communication" prepared by the Bureau of Standards. The input circuit of this receiver including the grid and filament of the vacuum tube 47 is variably tuned by the variable condenser 56 and is coupled to the antenna 57. The output circuit of the receiver includes the B battery 49, primary winding of the transformer 58 and the rotor coil 52 of the vario-coupler which is variably adjustable with respect to the coil 53, included in the input circuit of the receiver, by which the coupling between the output and input circuit is varied to control the amount of energy fed back from the output circuit to the input circuit. The output circuit of the radio receiver is inductively connected to the automatic telephone system through the transformer 58 and by reference to Fig. 2 it will be noted that this output circuit is connected to several pairs of conductors such as 35, 42 and 59, 60, leading to connector switch terminals such as 61 and 62. These terminals are multiply connected through the group of connector switches which the subscribers by dialing the predetermined number may adjust to connect their several telephone lines to the radio receiver. It will be noted that the test terminals such as 63, corresponding to terminals such as 61 and 62 of the several connector switches, are not multiply connected together so that as many subscribers may establish connections to the radio receiver as there are connector switches in the group.

As shown in Fig. 3 the brush shaft of the rotary switch A, which carries brush 33, has mounted thereon movable coil 52 of a vario-coupler, the fixed coil of which is designated 53. The movable coil 52 of this device is actuated by a pawl and ratchet mechanism operated by motor magnet 32 after the manner shown in the patent to Clement, previously mentioned. The structure of the variable condenser 56 is shown in Fig. 4 wherein the movable plates of the condenser are represented as driven by a pawl and ratchet mechanism arranged to be actuated by a motor magnet 46, also shown in the mentioned patent.

It should also be stated at this point that when relay 31 is operated the A battery 48 is connected in a circuit to light the filament of the vacuum tube 47, while the so-called B battery which is connected to the plate of the vacuum tube is shown at 49. The A battery 48 and the B battery 49 are distinct from the other operating battery which battery is diagrammatically represented at various positions in Figs. 1 and 2.

The calling subscriber, may now operate his dial sender springs 8 to transmit a small number of impulses, and each time that these springs are opened the relays 16 and 17 deenergize. While the dial impulse sender is transmitting this small number of impulses, the shunt springs 80, 81 and 82 are again closed to short-circuit the telephone transmitter and the telephone receiver so that the telephone receiver does not reproduce any unwanted signals during this portion of the adjustment of the radio receiver. The release of relay 16 closes a circuit from ground, at its armature and back contact, back contact and armature of sensitive relay 17, secondary off-normal springs 50, connector brush 23, conductor 35, outer left hand armature and front contact of relay 39, resistance 51, left hand winding of relay 41, to grounded battery. A circuit is also closed at this time through the right hand winding of relay 41 to ground through the winding of relay 40 and to ground in multiple therewith through the lower winding of relay 28. When the mentioned circuit is closed through the left hand winding of relay 41 it includes the resistance 51, which is of such value that the current through the left hand winding of relay 41 is the same as that through the right hand winding of this relay. Relay 41 is differentially wound but as soon as the dial springs 8 are again closed relays 16 and 17 are energized to open the circuit through the left hand winding of relay 41. In response to each of these impulses relay 41 retracts its armature, but the slow releasing relay 43 is maintained operated. In response to each retraction of the armature of relay 41 a circuit is completed from ground, armature and back contact of relay 41, inner armature and front contact of relay 43, winding of motor magnet 32 to grounded battery. As the motor magnet 32 advances the A switch in the manner thus described the secondary winding 52 of the vario-coupler is rotated about its axis, within the primary coil 53.

In order to complete the tuning of the radio set it is only necessary for the calling party to successively operate the push button 10. This push button each time that it is operated removes a short circuit from about the resistance coil 54 which causes the marginal relay 16 to deenergize but the sensitive relay 17 remains operated. The deenergization of relay 16 opens the circuit of slow releasing relay 18 allowing it to release whereupon a circuit is extended from ground at the armature and the back contact of relay 16, armature and back contact of relay 18, secondary off-normal contacts 55 connector brush 24, conductor 42, front contact and armature of relay 39, winding of relay 40 to ground, which short circuits and releases relay 40. This same ground is extended through the right hand winding of relay 41 to grounded battery, which maintains this relay energized. The release of relay 40 extends ground from its armature and back contact through the lowermost armature and front contact of relay 43, winding of motor magnet 46 of the variable condenser to grounded battery. The motor magnet 46 thus rotates the movable plates of the variable condenser 56 shown in Fig. 4.

When the subscriber at A replaces his receiver on its switchhook relay 16 deenergizes and effects the release of relay 13, which on its deenergization effects the operation of the release magnet 64 in a circuit completed from grounded battery, off normal contacts 65, back contacts and armatures of relays 13 and 16 to ground. Relay 13 on deenergization also opens the holding circuit extending through test brush 12, permitting the cut off relay 6 to deenergize and since the line switch is of the type that remains in the position last used the apparatus is in condition for extending another calling telephone line. When the connector switch is released from the terminals such as 30 relay 31 deenergizes, which restores the A switch to its normal position but the variable condenser however, remains in the position last used. The release of the connector restores relay 31 which opens the circuits leading to the A battery.

What is claimed is:—

1. In a system of the class described, a telephone line, a radio receiving set including a thermionic device provided with a grid, a plate and a filament, a grid circuit including said grid and filament, a plate circuit connecting said plate and filament, said grid and plate circuits being coupled together, means including an automatic switch for extending said telephone line to said radio receiving set, and means controlled over said telephone line for directively varying the coupling between said grid and plate circuits.

2. In a system of the class described, a telephone line, a radio set including an electron discharge device provided with a control element, an electron emitter and an anode, an imput circuit including said control element, an output circuit including said anode and said emitter, means including an automatic switch for extending said telephone line to said radio set, and means controlled over said telephone line for directively varying the coupling between input and said output circuits.

3. In a system of the class described, a telephone line, a radio set, means including a trunk and at least one numeral switch for interconnecting said telephone line and said radio set, means including an impulse sender at said telephone line for directively operating said numerical switch to extend said last mentioned connection, and means including a differential relay directively controlled over said connection for variably operating said radio set.

4. In a system of the class described, a telephone line, a radio set having a plurality of adjustable tuning means, means including at least one trunk and a numerical switch for interconnecting said telephone line and said radio set, means including an impulse sender at said telephone line for directively operating said numerical switch to extend said last mentioned connection, means including a differential relay directively controlled over-said connection by means of said impulse sender for variably operating one of said tuning means, and a manually controlled device at said telephone line for variably operating another of said adjustable tuning means.

5. In a system of the class described, a telephone line, a radio set having a plurality of adjustable tuning means, means including at least one trunk and a numerical switch for interconnecting said telephone line and said radio set, means including an impulse sender at said telephone line for directively operating said numerical switch to extend said last mentioned connection, means including a differential relay directively controlled over said connection by means of said impulse sender for variably operating one of said tuning means, and a resistance device at said telephone line for variably operating another of said adjustable tuning means.

6. In a system of the class described, a final connecting switch having sets of fixed contact, movable brushes cooperating therewith, a plurality of telephone lines terminating in certain of said fixed contacts, a radio set provided with an input circuit and an output circuit, said input circuit having a tuning condenser, one of said circuits being electrically connected to a set of fixed contacts, a special telephone line, means for connecting said special telephone line to said automatic switch, a dial sender in said last mentioned telephone line for directively operating said automatic switch to select any of the other telephone lines and for selecting the set of contacts connected to said radio set, and means controlled over said special telephone line for progressively adjusting the setting of said tuning condenser.

7. In a system of the class described, a telephone line, a radio set having tuning means including a condenser provided with a stator unit and a rotor unit, motor mechanism for progressively adjusting the setting of said rotor unit, means including trunks and at least one numerical switch for interconnecting said telephone line and said radio set, means including an impulse sender of said telephone line for directively operating said numerical switch to extend said last mentioned connection, and means including said telephone line for directively operating said motor mechanism over said last mentioned connection in response to impulses.

8. In a system of the class described, a plurality of telephone lines, means including an automatic switch for interconnecting said telephone lines, a radio receiver having an input circuit including but a single tuning condenser, means including said automatic switch for interconnecting one of said telephone lines with said radio receiver, and means controlled over said last mentioned telephone line for selectively adjusting the setting of said tuning condenser.

9. In a system of the class described, a plurality of telephone lines, means including an automatic switch for interconnecting said telephone lines, a radio receiver provided with a plurality of tuning controls, means including said automatic switch for interconnecting one of said telephone lines with said radio receiver, and means governed over said last mentioned telephone line for directly adjusting said tuning controls.

10. In a system of the class described, a plurality of telephone lines, a radio receiver, including a vacuum tube having a source of heating current associated therewith, means including an automatic switch for extending any of said telephone lines to said radio receiver, and means responsive to the connection of any of said telephone lines to said radio receiver for connecting the heating current to said vacuum tube.

11. In a system of the class described, a plurality of stations, each provided with a signal reproducer, a radio receiver, having a plurality of tuning controls, a pair of conductors individual to each station for connecting the signal reproducer thereof to said radio receiver, and motor devices operated over any of said pairs of conductors for selectively actuating said tuning controls.

12. In a system of the class described, a plurality of stations, each provided with a signal reproducer, a radio receiver including a vacuum tube and provided with a plurality of tuning controls, a pair of conductors for each station connecting the signal reproducer thereof to said radio receiver, and motor devices directively operated over any of said pairs of conductors to effect a desired setting of said tuning controls.

13. In a system of the class described, a plurality of telephone lines, a radio receiver, including an input circuit having but a single tuning condenser for tuning said input circuit to various frequencies, means for connecting any of said telephone lines to said radio receiver, and means controlled over the connected telephone line for selectively adjusting the setting of said tuning condenser.

14. In a system of the class described, a plurality of stations each provided with a signal reproducer, a radio receiver, a pair of conductors for each station connecting the signal reproducer thereof to said radio receiver, said radio receiver having an input circuit tuned by a condenser consisting of a stator unit and a rotor unit, and a motor device directively operated over any of said pairs of conductors for progressively adjusting the setting of said rotor unit.

15. In a system of the class described, a plurality of telephone lines, a radio receiver including a vacuum tube having a source of heating current associated therewith, means responsive to the connection of any of said telephone lines to said radio receiver for connecting heating current to said vacuum tube, and means controlled over said last mentioned telephone line for selectively tuning said radio receiver.

16. In a system of the class described, a plurality of stations, each station provided with a signal receiver, a radio receiver, pairs of conductors for connecting the signal receivers of said stations to said radio receiver, said radio receiver being provided with a vacuum tube and with a plurality of tuning controls, means responsive to the connection of a pair of conductors to said radio receiver for closing a heating circuit for said vacuum tube, and motor devices directively operated over said last mentioned pair of conductors to effect a desired setting of said tuning controls.

17. In a system of the class described, a plurality of telephone lines each provided with a telephone signal reproducer, a radio receiver including an input circuit provided with tuning means having but a single condenser for tuning said input circuit to various frequencies, means for connecting any of said telephone lines to said radio receiver, means controlled over the connected telephone line for selectively adjusting the setting of said tuning means, and means to prevent reproduction through the telephone signal reproducer of the connected telephone line during at least a portion of the adjustment of said tuning means.

18. In a system of the class described, a plurality of stations each provided with a telephone signal reproducer, a radio receiver, a pair of conductors for each station connecting the telephone signal reproducer thereof to said radio receiver, said radio receiver having an input circuit tuned by tuning means including a condenser consisting of a stator unit and rotor unit, and motor mechanism directively operated over any of said pairs of conductors for progressively adjusting the setting of said tuning means including said rotor unit, and means for disabling the telephone signal reproducer during at least a portion of the adjustment of said tuning means.

19. In a system of the class described, a plurality of stations each provided with a signal reproducer, a radio receiver, a pair of conductors for each station connecting the signal reproducer thereof to said radio receiver, tuning means for said radio receiver including a condenser, motor mechanism directively operated over any of said pairs of conductors for progressively adjusting the setting of said tuning means, and means to prevent reproduction through said signal reproducer during at least a portion of said tuning adjustment.

20. In a system of the class described, a plurality of stations each provided with a signal reproducer, a radio receiver, a pair of conductors for each station connecting the signal reproducer thereof to said radio receiver, tuning means for said radio receiver including a condenser, motor mechanism directively operated over any of said pairs of conductors for progressively adjusting the setting of said tuning means, and means to short-circuit said signal reproducer during at least a portion of said tuning adjustment.

21. In a system of the class described, a plurality of telephone lines each provided with a telephone signal reproducer, a radio receiver including a vacuum tube having a source of heating current associated therewith, means responsive to the completion of a circuit over any one of said telephone lines to said radio receiver for connecting heating current to said vacuum tube, means controlled over said last-mentioned telephone line for selectively tuning said radio receiver, and means to prevent reproduction through the telephone signal reproducer of said last-mentioned telephone line during at least a portion of the tuning of the radio receiver.

22. In a system of the class described, a plurality of telephone lines each provided with a telephone signal reproducer, a radio receiver including a vacuum tube having a source of heating current associated therewith, means responsive to the completion of a circuit over any one of said telephone lines to said radio receiver for connecting heating current to said vacuum tube, means controlled over said last-mentioned telephone line for selectively tuning said radio receiver, and means to short-circuit the signal reproducer of said last-mentioned telephone line during at least a portion of the tuning of the radio receiver.

23. In a system of the class described, a station provided with a signal reproducer, a radio receiver, telephone conductors connecting the signal reproducer to said radio receiver, tuning means for said radio receiver, motor mechanism directively operated over said conductors for progressively adjusting the setting of said tuning means, and means to prevent reproduction from said radio receiver during at least a portion of said tuning adjustment.

24. In a system of the class described, a station provided with a signal reproducer, a radio receiver, telephone conductors connecting the signal reproducer to said radio receiver, tuning means for said radio receiver including a condenser, motor mechanism directively operated from said station over said conductors for progressively adjusting the setting of said tuning means, and means to short-circuit said signal reproducer during at least a portion of said tuning adjustment.

In witness whereof, I hereunto subscribe my name this 30th day of June, A. D. 1932.

WINFRED T. POWELL.